Sept. 24, 1963  R. C. FISCHER  3,104,513
CONVERTIBLE SIDE DELIVERY RAKE
Filed Aug. 24, 1960  4 Sheets-Sheet 1
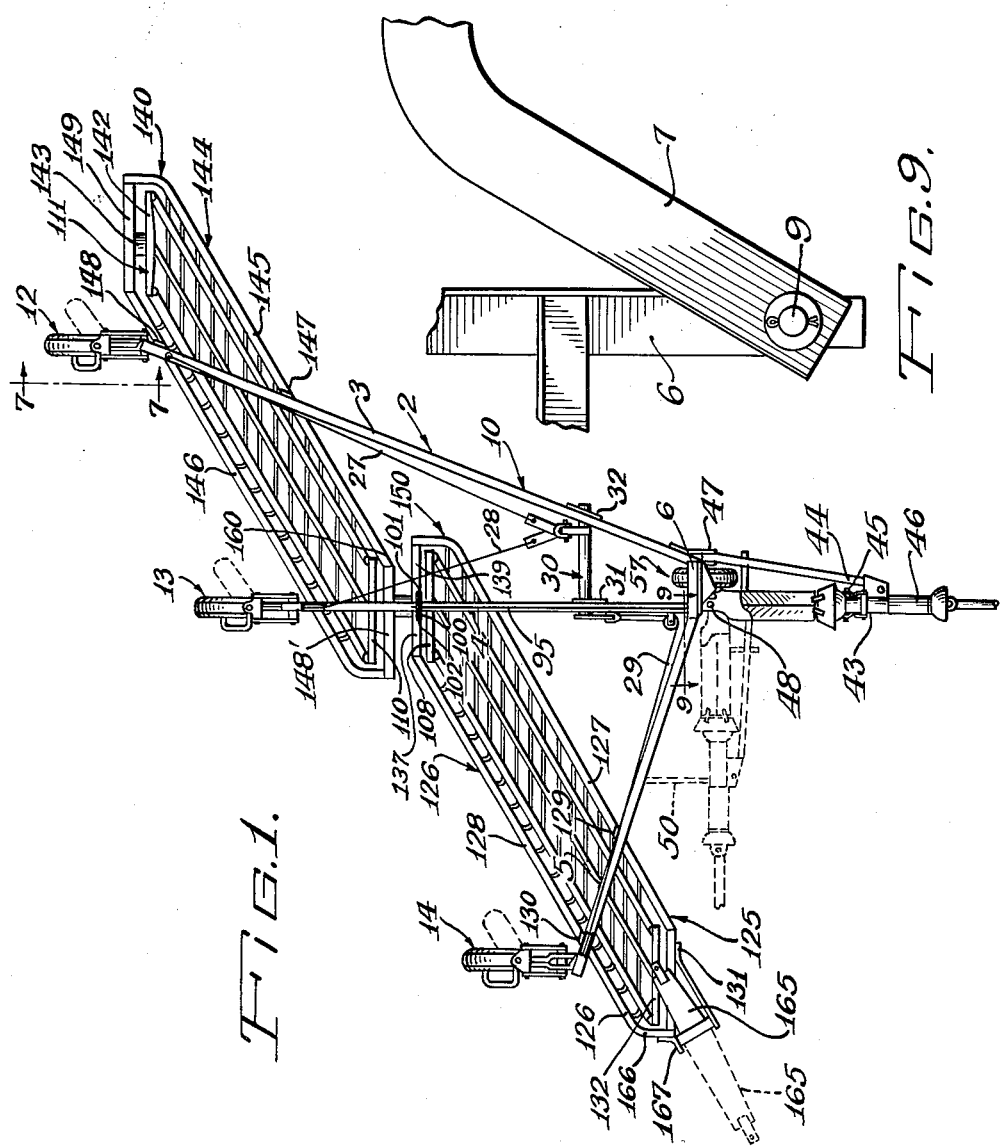
Inventor:
Raymond C. Fischer
Paul O. Pippel
Atty.

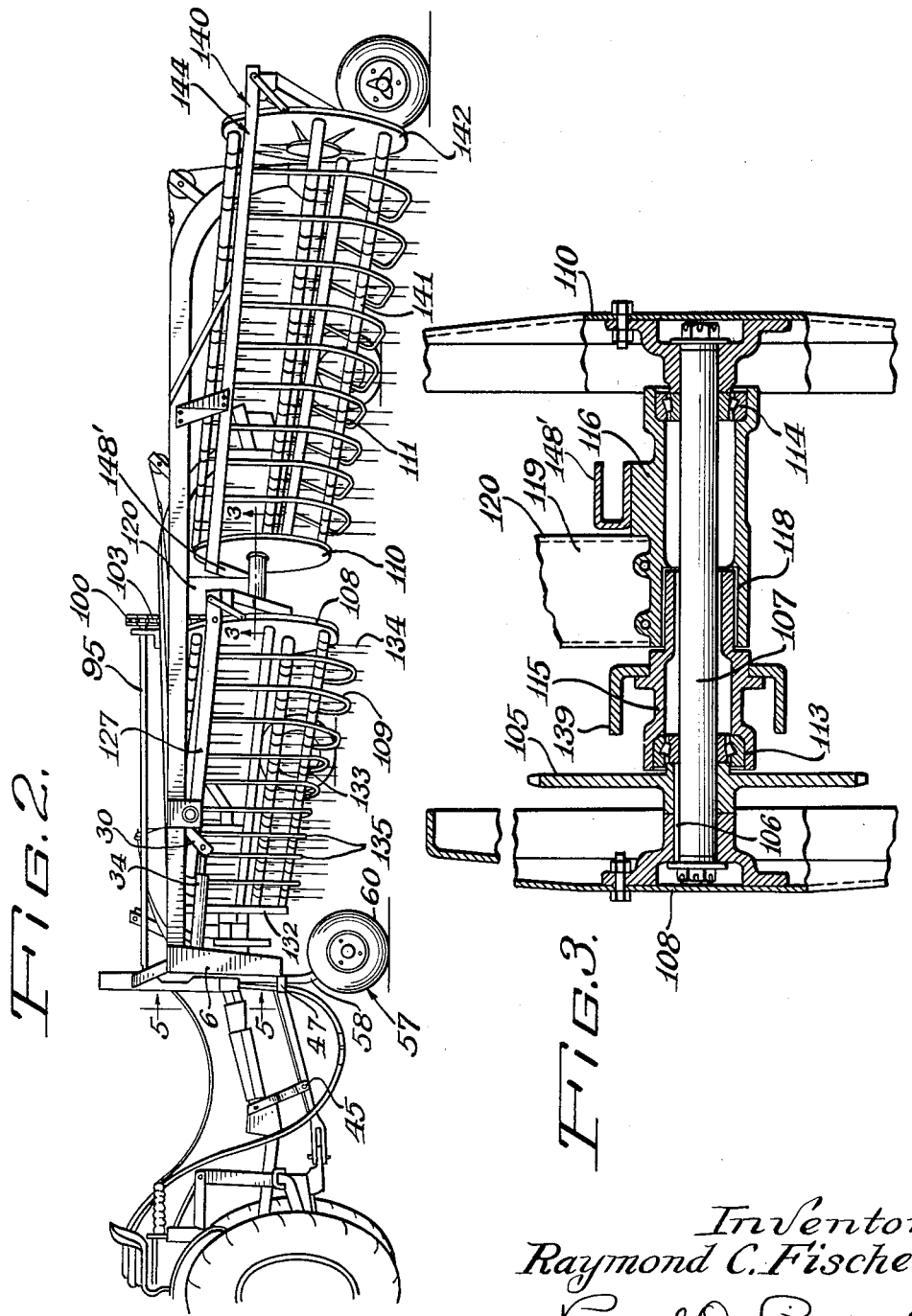

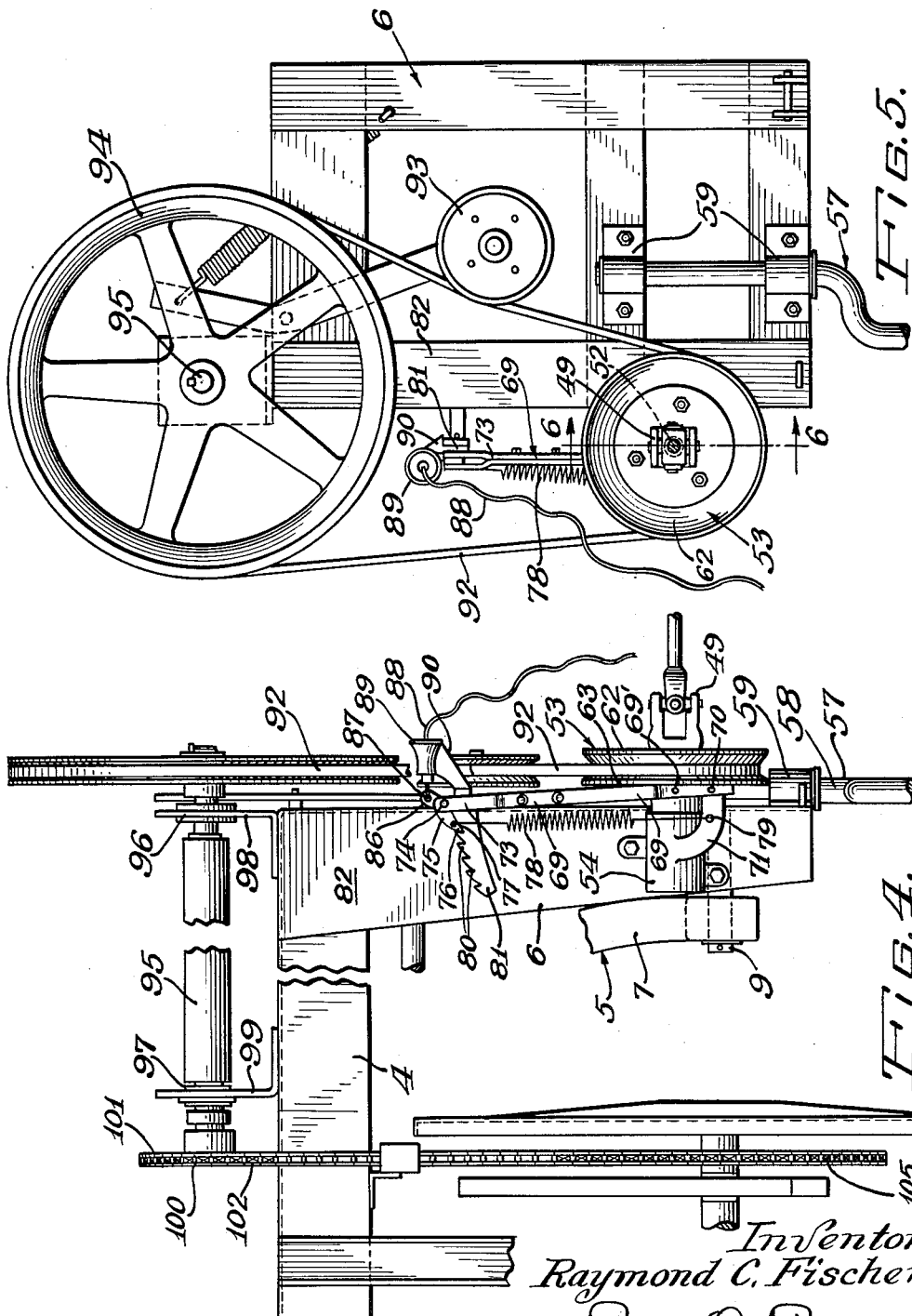

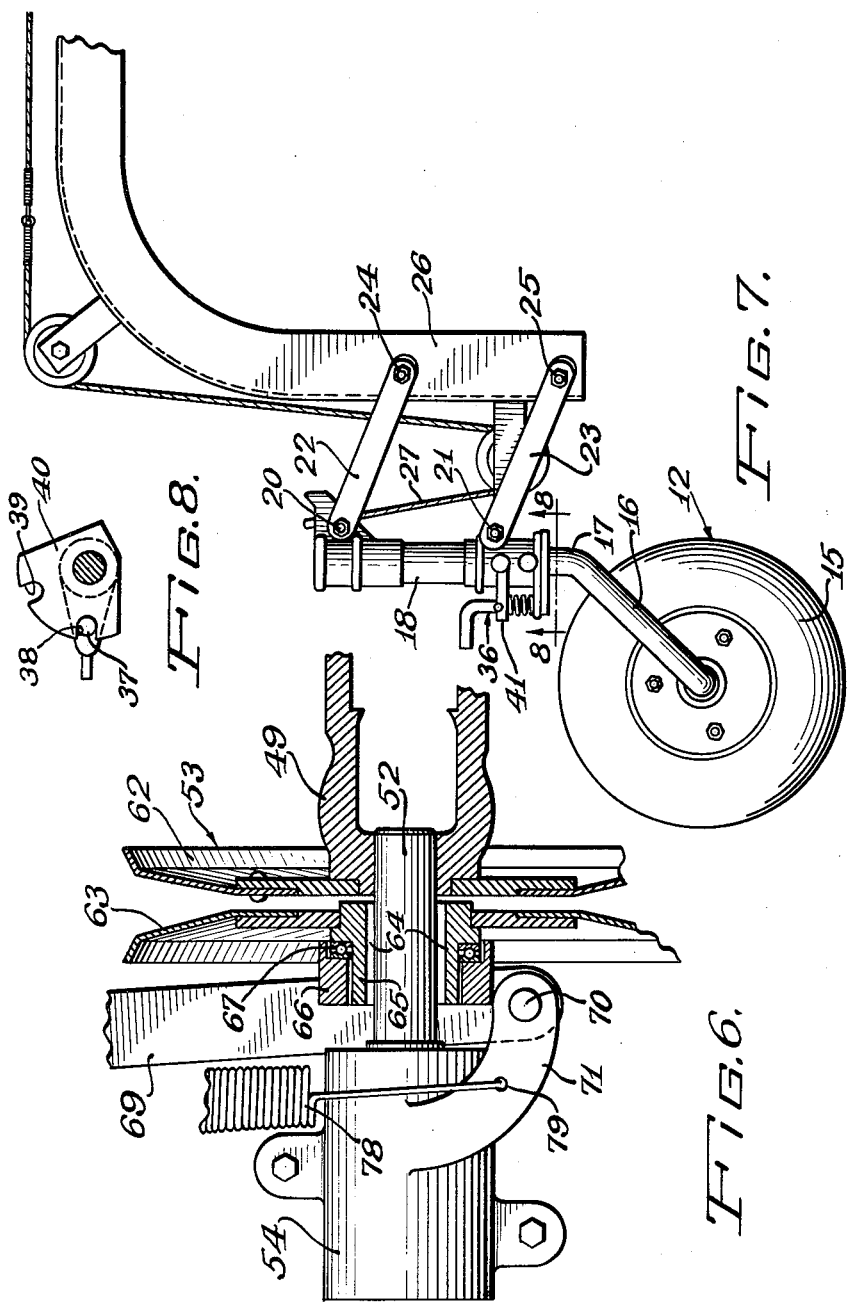

United States Patent Office 3,104,513
Patented Sept. 24, 1963

3,104,513
CONVERTIBLE SIDE DELIVERY RAKE
Raymond C. Fischer, Hinsdale, Ill., assignor to International Harvester Company, Chicago, Ill., a corporation of New Jersey
Filed Aug. 24, 1960, Ser. No. 51,728
6 Claims. (Cl. 56—377)

This invention relates to rakes and more particularly to a novel rake which is considerably wider than conventional.

In current farming methods, rakes have attained a conventional width and are normally of between 7 to 10 feet. The need for raking widths of greater extent is of course limited to large scale farming operations and normally it is not feasible for a manufacturer to provide a specific rake of such increased size without an excessive penalty pricewise to the farmer. Furthermore, the amount of business is not readily conducive to a manufacturer considering a limited production. Another problem which is generated in providing an excessively wide rake is that as the rake travels over uneven terrain it is unwieldy to maneuver and at the same time fails to conform to the terrain condition, and thus either scalps the high spots or misses the low areas. In general, these disadvantages have compromised the design so that it becomes prohibitively expensive or functionally is not entirely suitable for various operations.

A general object of the invention is to provide a novel rake which is approximately double that of conventional rakes and wherein the parts are so arranged that many parts of a single width rake are utilized.

A further object of the invention is to provide a novel exceptionally wide rake incorporating a novel drive mechanism for increasing or decreasing the speed of rotation of the raking reel.

A still further object of the invention is to provide a novel wide rake having a support frame structure of novel form for floatingly supporting the raking means which is in the form of a plurality of separate raking baskets and reels.

A different object of the invention is to provide a novel frame and support structure for the rake incorporating wheel means which are locked in different positions for raking and transport operations so that the rake is maintained in a proper raking attitude transversely of the direction of operation in raking position and is pulled lengthwise for transport.

A still further object of the invention is to provide a novel rake which comprises a pair of laterally spaced raking assemblies which are hinged together about a common fore and aft axis to accommodate lateral float of the individual portions and at the same time provide a common drive to both of the raking means.

These and other objects of the invention inherent in and encompassed therein will become more readily apparent from the specification and the drawings wherein:

FIGURE 1 is a plan view, partially diagrammatic, of the invention;

FIGURE 2 is a perspective side elevational view of the novel rake as attached to a tractor, which is fragmentarily shown;

FIGURE 3 is an enlarged sectional view of the drive taken substantially on line 3—3 of FIGURE 2;

FIGURE 4 is a broken apart side-elevational view of the drive shown in FIGURE 5;

FIGURE 5 is an enlarged fragmentary front view of the driving mechanism taken substantially on line 5—5 of FIGURE 2;

FIGURE 6 is an enlarged sectional view taken substantially on line 6—6 of FIGURE 5;

FIGURE 7 is an enlarged side-elevational view of one of the rear-support wheel mechanisms taken substantially on line 7—7 of FIGURE 1;

FIGURE 8 is an enlarged sectional view of a portion of the wheel mechanism taken substantially on line 8—8 of FIGURE 7; and FIGURE 9 is an enlarged sectional view taken substantially on the line 9—9 of FIGURE 1.

Describing the invention in detail and having particular reference to the drawings, the novel rake therein shown comprises a frame structure generally designated 2 which includes forwardly converging main arch beams 3, 4, and 5, the forward ends of the members 3 and 4 being rigidly connected to a vertical support or frame structure 6 and the forward end of the beam 5 having its forward downwardly extending end portion 7 pivotally connected on a fore and aft generally horizontal axis to a pin 9 which is carried from the frame 6 whereby the beam member 5 is afforded a cantilever support and projects laterally outwardly with respect to the rigid frame constituted by members 3, 4, and 6 forming the principal structure generally designated 10. Thus it will be seen that the member or the beam or sub-frame 5 is vertically swingable relatively with respect to the principal frame structure 10.

The rear ends of each of the frame members 3, 4, and 5 are supported by vertically adjustable wheel assemblies generally designated 12, 13, and 14. Each wheel assembly comprises a wheel 15 spindled on the lower end of an arm 16, which is comprised of an upwardly extending spindle 17 journalled in a journal structure 18. The journal structure 18 is preferably a tubular member and is pivotally connected on generally horizontal axes at vertically spaced points as at 20 and 21 to the rear ends of forwardly extending upper and lower parallelogram links 22 and 23 which at their forward ends are pivotally connected respectively as at 24 and 25 to the downwardly extending leg portion 26 of the associated beam. Thus the wheel and axle assembly is controlled for vertical rectilinear movement to adjust the relative height of the associated beam member. The adjustment is accomplished by means of cable lengths 27, 28, and 29, which are appropriately trained over and under sheaves as best seen in the drawings in order to load the cable in tension in supporting the appropriate frame member from the respective wheel assembly. The cables 27 and 28, as well as the cable 29, are suitably connected to the lever mechanism 30 which is rotatably supported from the bearing structures 31, 32 on the members 4 and 3, the lever assembly 30 being actuated by a hydraulic ram mechanism 34 which extends between the lever assembly 30 and the frame structure 6 and anchored thereto in usual manner.

Each wheel assembly 12, 13, and 14 is positionable in operating position as shown in solid lines in FIGURE 1 and in transport position as shown in phantom lines in FIGURE 1. Wheel 14 is fully casterable. However, wheels 12 or 13 are maintained in the respective positions by means of a spring-loaded latch assembly generally indicated 36, which is manually operable to insert the bolt portion 37 in either of two notches 38 or 39 for locking the wheels 12 or 13 respectively in the operating position or the transport position, said notches 38 and 39 being formed in the periphery of a locking plate 40 which is fixedly secured to the stem or spindle 17 of the associated wheel and the latch being carried by a bracket structure 41 fixed to the journal part 18.

It will be noted from FIGURE 1 that as shown in solid lines the power-drive shaft 43 extends fore and aft and is maintained in such position by means of the laterally swingable framework 44 which is pivoted as at 45, FIGURE 2, to a portion of the shielding 46 and the rear end of the framework 44 being pivotally and releasably secured as at 47 to the front frame structure 6. In the transport position, the drive assembly is swung laterally about the universal knuckle joint pin 48 which is mounted and connected to the jaw 49 of the drive. The drive shaft assembly as well as the frame assembly 44 is swingable laterally about the pivot 48 to a laterally displaced position as shown in phantom lines in FIGURE 1 and is supported from a hook 50 depending from beam 5 and projecting forwardly therefrom.

The forward end 50 of the main frame is supported by a caster wheel assembly 57 which comprises a wheel 60 carried from a spindle structure 58 which is journalled to rotate about a vertical axis from the lower end of frame 6 by journals 59.

A variable speed drive assembly 53 is carried by a bearing casting 54 from frame 6 and comprises a stationary pulley section 62 and an axially movable pulley sheave 63 which is keyed as at 64 (FIGURE 6) to the shaft 52 by means of the axially movable hub 65 which is actuated by the collar 66 through the thrust bearing 67, the collar 66 being actuated through pivot 69' by the lever or fork 69 which is pivoted as at 70 at its lower end on the arm structure 71 which is formed integral with the bearing casting 54, the fork structure 69 terminating in upper end portion 73 which is pivoted as at 74 (FIGURE 4) to a pawl 75, the pawl 75 having its tooth 76 connected as at 77 to one end of a tension spring 78 which is connected at its other end as at 79 to the arm 71, the spring 78 biasing the tooth 76 into engaging position with a selected tooth 80 on the control member 81 which is mounted from the adjacent beam 82 of the frame structure 6, the member 81 underlying the pawl 75 which has an upwardly extending operating portion 86 with an eye 87 which is fastened to one end of a cord or pull rope 88 which operates through a sleeve 89 upon extension 90 of the member 81. The eye 89 is an anti-friction guide for the rope or cable 88, which is adapted to be pulled forwardly with attendant pivoting the tooth portion 75 upwardly and disengaging it from the tooth member, and since the belt tension of the belt 92 tends to separate the movable sheave 63 from the stationary sheave 62, there is a tendency for the lever or fork 69 to swing rearwardly so that by proper manipulation of the rope 89 the position of the pawl tooth 76 may be determined for engagement with a selected tooth 80 in the tooth member 81. It should be realized that as the lever 69 swings rearwardly the diameter of the sheave 53 becomes smaller and therefore the drive through the belt 92 as maintained by the spring-pressed arm-carried idler assembly 93 is slowed to the output or intermediate pulley 94 which is driven by the belt 92 and which is keyed to the intermediate shaft or countershaft 95 which is carried by a pin of spaced bearings 96 and 97 from brackets 98 and 99 which are mounted on the beam member 4 maintaining the shaft assembly 95 in vertical alignment with the member 4.

The shaft assembly 95 is connected at its rear end to a sprocket 100 which drives a chain 101 which has its runs 102 and 103 passing at opposite sides of a beam member 4 and trained about the sprocket 105 (FIGURE 3) which is keyed as at 106 to the combination support and power-transmitting shaft 107 which carries the rear end member 108 of the front rake reel 109 and the front end member 110 of the rear rake wheel 111. The shaft 107 interconnects the end members 108 and 111 and is carried on bearings 113 and 114 within remote ends of the sleeves 115 and 116 which are telescoped loosely as at 118 at adjacent ends whereat the outer sleeve is connected to the lower end 119 of a dependent support 120 which is connected to the beam member 4 intermediate its ends.

The front rake generally designated 125 comprises in addition to the basket 109, a frame 126 which is rigidly connected at its front and rear frame members 127 and 128 by brackets 129 and 130 to the beam member 5. The forward ends of the members 126 and 127 are interconnected by the framework 131 which mounts the front end member 132 of the reel, the end member 132 being interconnected with the end member 108 by means of the plurality of rake bars 133 which have their teeth 134 operating through and between the stripper bars 135 which extend under the reel and connect to the front and rear beam members at 127 and 128. The rear ends of beams 127 and 128 are interconnected by beam 137 which connects to bearing 115. The rear rake generally designated 140 comprises in addition to the reel 111 which includes a plurality of bars 141 which interconnect the front end member 110 of the rear rake basket generally indicated 144 which includes front and rear beam members 145 and 146 which are connected by brackets 147 and 148 to the beam member 3 of the frame structure 2, and end beams 148', 149, beam 148' connected to bearing 116 and beam 149 carrying end member 142 by a journal 143.

Both of the rakes are in essence similar to that shown in U.S. Patent 2,861,415.

It will be readily appreciated that inasmuch as the drive shaft 107 is on the same center line as the pivot 9 of the cantilever frame 5 and that the suspension of the rake 140 from the main frame or auxiliary frame 10 is through the medium of the drive shaft 107 that there is a hinged connection between the two rakes and that the delivery end 150 of the front rake overlaps the front end 160 of the rear rake. Thus a novel floating double width rake is provided wherein the rake tends to follow contours in the land, that is if there should be a depression along the medial beam then the middle of the rake would be lowered. Similarly, if either end of the rake would be operating through depressions that end would be operating at different elevations as gauged by the contour of the terrain.

When the rake is to be transported from location to location, the wheels are adapted to be angled so that they move along in a path parallel to the length of the rake and at that time the drive assembly 43 is laid against the rake and hung from the hook 50 and the rake is pulled by means of an auxiliary draft structure 165 which is connected to the front end 166 of the front rake primarily to the frame structure 131, the hitch 165 being in the nature of a tongue pivoted on a substantially horizontal axis 167 so that the same may be folded over as shown in solid lines in FIGURE 1 or extended for pulling as shown in phantom lines in FIGURE 1.

It will be appreciated that the structure herein described is exemplary in form and that other obvious modifications will become readily apparent to those skilled in the art within the scope of the appendant claims.

What is claimed is:

1. In a side delivery rake the combination of a frame having a front structure and a medial and flanking beams diverging rearwardly from said front structure, independent raking means pivotally supported from said medial beam on a common horizontal fore and aft axis and extruding laterally therefrom and connected to respective flanking beams, at least one of said flanking beams pivotally connected to the front structure coaxially with said axis, and ground-traversing means independently supporting each beam and said front structure from the ground.

2. The invention according to claim 1 and further characterized in that certain of said ground-traversing means comprises a wheel assembly, and direction control means between said wheel means and each beam operative to hold the wheel means in a plurality of rake-directing positions.

3. A side delivery rake comprising a longitudinal main frame adopted to travel forwardly over the field at a normally fixed height above the ground; said frame comprising a pair of laterally spaced portions hinged together for relative vertical movement about a generally horizontal fore and aft extending axis, side delivery rake means including a pair of laterally spaced sections extending transversely of the frame and each section including a cylindroid type raking reel having tooth bar mounting discs at each end, said reels disposed end to end, a common support on one of the frame portions for the adjacent ends of the reels including a drive shaft coaxial with the pivotal axis between said frame portions, and means supporting one reel from one portion and the other from the other portion for vertical swinging movement therewith.

4. The invention according to claim 3 and said frame comprising a main longitudinal beam structure overlaying the drive shaft, a countershaft supported from the beam structure, and means drivingly connecting the countershaft with the drive shaft and associated power source forwardly of the rake.

5. In a side delivery rake, a frame including a front structure and a pair of longitudinal beams having forward ends rigidly connected to the front structure and having rear ends with ground-traversing wheel means, another beam extending diagonally laterally and rearwardly from said front structure and pivoted thereto on a generally fore and aft extending substantially horizontal axis, and a pair of cylindrical raking reels, one reel supported from the pair of beams and the other reel pivotally supported from one of the pair of beams coaxial with said axis and carried from the other of said beams.

6. The invention according to claim 5 wherein each said reel comprises a pair of rotatable end members having parallel axes of rotation laterally and axially displaced from one another, rake bars having connection at opposite ends with the respective end members, and said pivotal support comprising a common drive shaft for adjacent end members.

References Cited in the file of this patent
UNITED STATES PATENTS

| | | |
|---|---|---|
| 2,336,002 | Everett | Dec. 7, 1943 |
| 2,611,227 | Keller | Sept. 23, 1952 |
| 2,639,575 | Richey | May 26, 1953 |
| 2,718,159 | Sisulak | Sept. 20, 1955 |
| 2,840,977 | Van der Lely et al. | July 1, 1958 |

FOREIGN PATENTS

| | | |
|---|---|---|
| 1,163 | Great Britain | 1907 |
| 55,144 | France | Dec. 20, 1950 |